Jan. 31, 1950 L. F. STRADER 2,495,786
PREVENTION OF AFTERBURNING IN A MOVING
BED CATALYST REGENERATION PROCESS
Filed May 29, 1945 9 Sheets-Sheet 6

INVENTOR
Leroy F. Strader
BY
ATTORNEYS

Patented Jan. 31, 1950

2,495,786

UNITED STATES PATENT OFFICE 2,495,786

PREVENTION OF AFTERBURNING IN A MOVING BED CATALYST REGENERATION PROCESS

Leroy F. Strader, Long Beach, Calif., assignor, by mesne assignments, to Houdry Process Corporation, Wilmington, Del., a corporation of Delaware Application May 29, 1945, Serial No. 596,573

5 Claims. (Cl. 252—418)

My invention relates to improvements in the regeneration of catalysts used to promote the cracking of hydrocarbons and thus contaminated with "coke" deposited as an incident of the cracking reaction. The coke deposited upon the catalyst during cracking, although sometimes termed "carbon," is not usually carbon in the chemical sense but is either a mixture of hydrocarbons with a very low hydrogen-carbon ratio or a mixture of such hydrocarbons including some elemental carbon and sometimes contains residues of sulfur and nitrogen compounds originally present in the hydrocarbon stock subjected to cracking. Regeneration of the catalyst involves removal of this contaminating coke and this is usually accomplished by bringing the spent catalyst into contact with air at a temperature appropriate to burn off the coke. Such regeneration operations are critical, assuming economy to be of some consequence since catalysts and particularly synthetic catalysts of relatively high activity are expensive, for efficient utilization of the catalyst requires quite complete elimination of the coke, a result promoted by increasing the severity of the burning, while the catalyst is physically degraded and suffers loss of activity if exposed to severe burning, particularly to high temperatures.

My invention relates more particularly to improvements whereby "afterburning" in one type of such regeneration operations is prevented. The problem of afterburning, a critical problem wherever synthetic catalysts have been used, has been the subject of study by a large number of technicians in many refineries and in many laboratories for many months but no satisfactory solution to the problem has hitherto appeared, neither a general solution of the problem nor a particular solution applicable to the type of regeneration operation to which my invention relates. My invention relates specifically to regeneration operations in which the cracking catalyst carrying deposited coke is regenerated by passing it, in a kiln, through a series of zones in which it is blown with air whereby the coke is progressively burned off; these catalysts comprising a plurality of inorganic refractory oxides, as known to the art.

In this type of regeneration operation, with the conditions within each of the several zones regulated to avoid, in the first instance, overburning of the catalyst with consequent degradation and loss of activity, but to produce a regenerated catalyst leaving the last zone substantially free from coke, the products of initial combustion include carbon monoxide as well as carbon dioxide and the proportion of carbon monoxide is normally substantial. Conversion of carbon to carbon monoxide removes it from the catalyst just as effectively as conversion to carbon dioxide but the heat of combustion of carbon burned to carbon dioxide is more than twice that of carbon burned to carbon monoxide. However, an excess of air is required to maintain appropriate burning conditions so that the products of initial combustion also include a substantial proportion of oxygen available to burn such carbon monoxide. Burning of the carbon monoxide content of the gaseous mixture usually produced while still in heat exchanging relationship with the catalyst is the phenomenon termed "afterburning." When it occurs the catalyst is subjected to overburning and the kiln structure also is subjected to conditions involving rapid structural deterioration. The heat liberation and consequently the temperatures involved in afterburning are high because the heat of combustion of carbon monoxide burned to carbon dioxide is high. Thus, afterburning involves serious losses in terms of degradation and loss of activity of catalyst and in terms of maintenance of the regeneration equipment. My invention prevents afterburning, in the type of regeneration operation to which it relates, and thus eliminates the losses resulting from afterburning.

As stated, my invention relates specifically to the regeneration of cracking catalysts carrying deposited coke by passing the catalyst in a kiln, through a series of zones in which it is blown with air whereby the coke is burned off. In accordance with my invention, air is supplied to the several zones at a rate providing about 100%–300% excess with respect to the coke burned off and water vapor is added to the air supplied to the zones through which the catalyst passes at an early intermediate stage of its progress through the kiln at rates aggregating about 0.1% to 3% or better about 0.1% to 1% by weight on the catalyst (as defined below) whereby afterburning of products of initial combustion in contact with the catalyst in the kiln is prevented.

The accompanying drawings illustrate apparatus appropriate for carrying out my invention. Although diagrammatic and conventional, these drawings are in general of scale proportions although in some instances, notably in Figure 2, parts have been spaced to promote clarity of illustration. Referring to these drawings.

Figure 1:
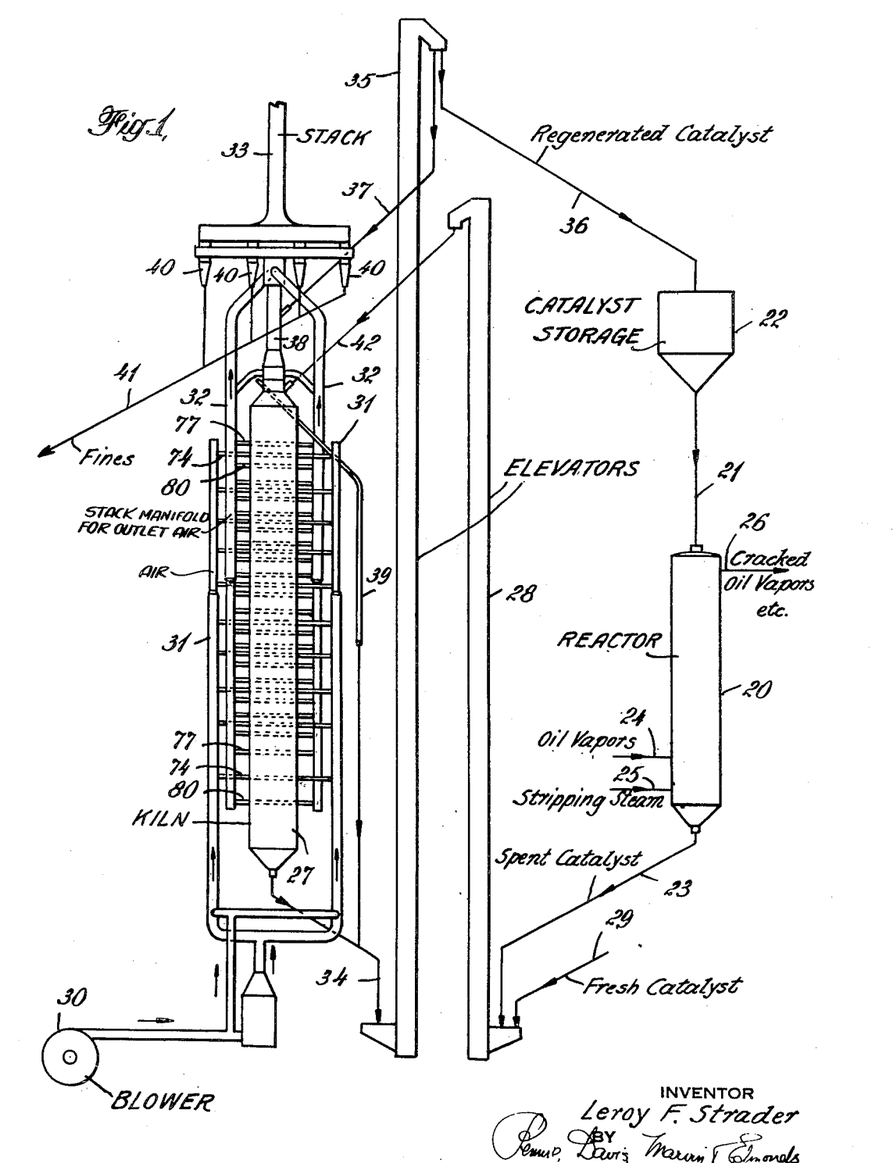
Figure 1 is a flow diagram of a cracking operation embodying a regeneration, carried out in the kiln at the left of the drawing, of the type to which my invention relates.
Figure 3:
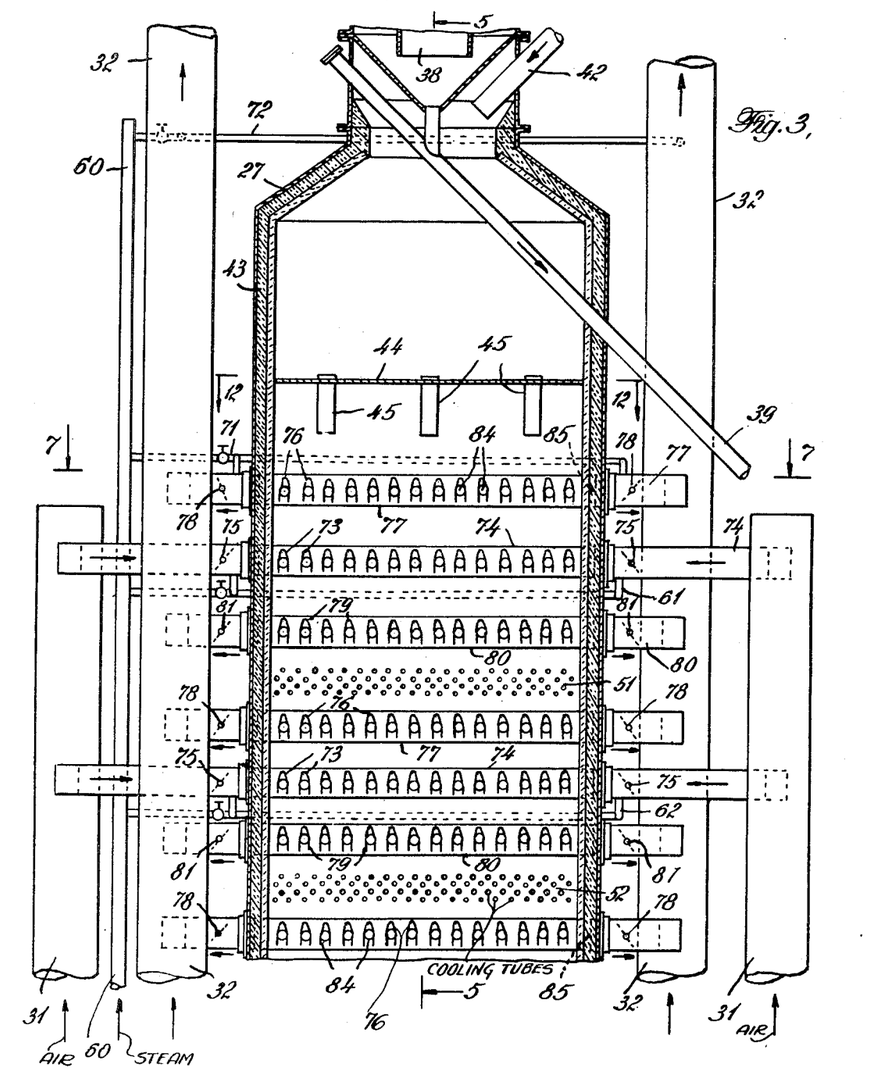
Figures 3 and 4 are, respectively, enlarged sections of the upper and lower parts of the kiln illustrated in Figure 2, sections on line 3—3 of Figures 5 and 7 and on line 4—4 of Figure 6, respectively.
Figure 4:
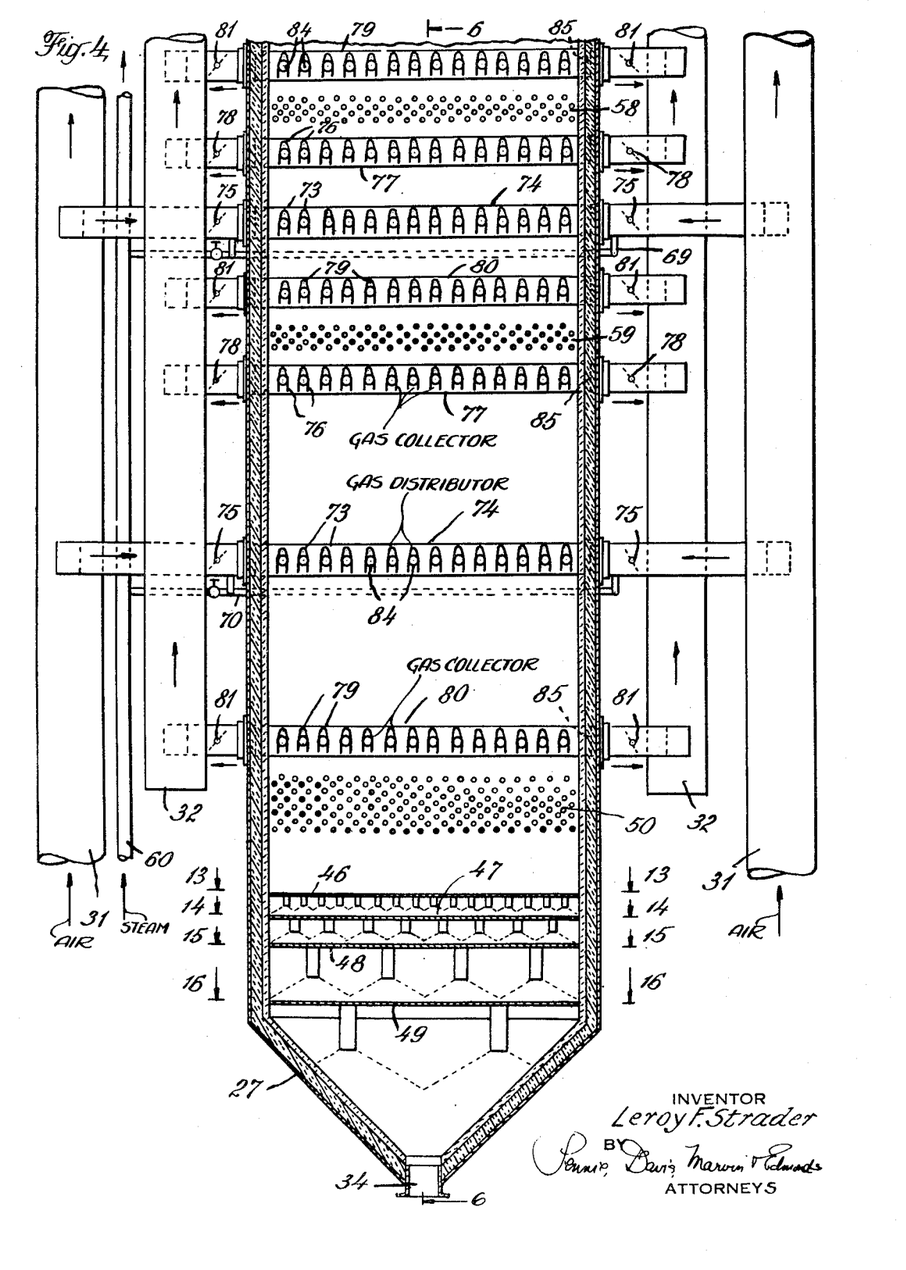

Referring to Figure 1 as a diagram of the cracking operation as a whole: A charge of catalyst is maintained in a reactor 20, the regenerated catalyst being supplied from storage chamber 22 through connection 21 and spent catalyst being discharged through connection 23. The temperature in the reactor may approximate, for example, 900°–975° F. and the pressure in the reactor may approximate 6–10 lbs. per square inch gauge. Connection 21 is made long enough to serve as a seal. The hydrocarbons to be cracked are introduced into the reactor as a vapor mixture through connection 24. Steam to strip the spent catalyst leaving the reactor of vaporizable material is introduced through connection 25. The cracked hydrocarbons together with any uncracked material and the stripping steam leave the reactor as a vapor mixture through connection 26. Spent catalyst is lifted to the top of the kiln 27 by means of bucket elevator 28, entering the kiln through connection 42. Any fresh catalyst required to maintain the volume of catalyst in circulation in the system is introduced through connection 29 and lifted to the top of the kiln 27 by means of elevator 28 together with the spent catalyst. The catalyst moves downwardly through the kiln through a series of zones through which air is blown by means of blower 30 and distributing ducts or manifolds 31 with appropriate connections to each of the several zones. The products of combustion escape from each of the several zones through ducts or manifolds 32, ultimately escaping through stack 33. The regenerated catalyst discharged from the lower end of the kiln through connection 34 is lifted to the catalyst storage chamber 22 by means of bucket elevator 35. Part of the regenerated catalyst passes from the head of elevator 35 directly to chamber 22 through connection 36. Another part, 5%–10% of the total for example, passes through connection 37 to an elutriator 38. In this elutriator this diverted part of the regenerated catalyst falls through a rising stream of part of the gases passing to the stack, the fines being carried off with the gases and the coarser material returned through connection 39 to the foot of the elevator 35 (see Figure 3) or returned to the upper end of the kiln (see Figure 18). In this manner the proportion of fines in the circulating catalyst can be kept within a chosen maximum. As a control, the proportion of the stack gases diverted through the elutriator can be varied or the proportion of the regenerated catalyst diverted to the elutriator can be varied. Before escaping through the stack 33 the products of combustion pass through a series of cyclone separators 40 in which fines carried out of the elutriator together with any fines carried out of the kiln proper are separated and discharged through connection 41. The kiln, the catalyst storage chamber, the reactor, the elevators and the several connections through which the catalyst passes are thermally insulated to minimize heat loss. By passing fresh catalyst through the kiln as it enters the system, such fresh catalyst is brought to the same temperature as the bulk of the circulating catalyst before it enters the catalyst storage chamber or the reactor.

Figure 2:
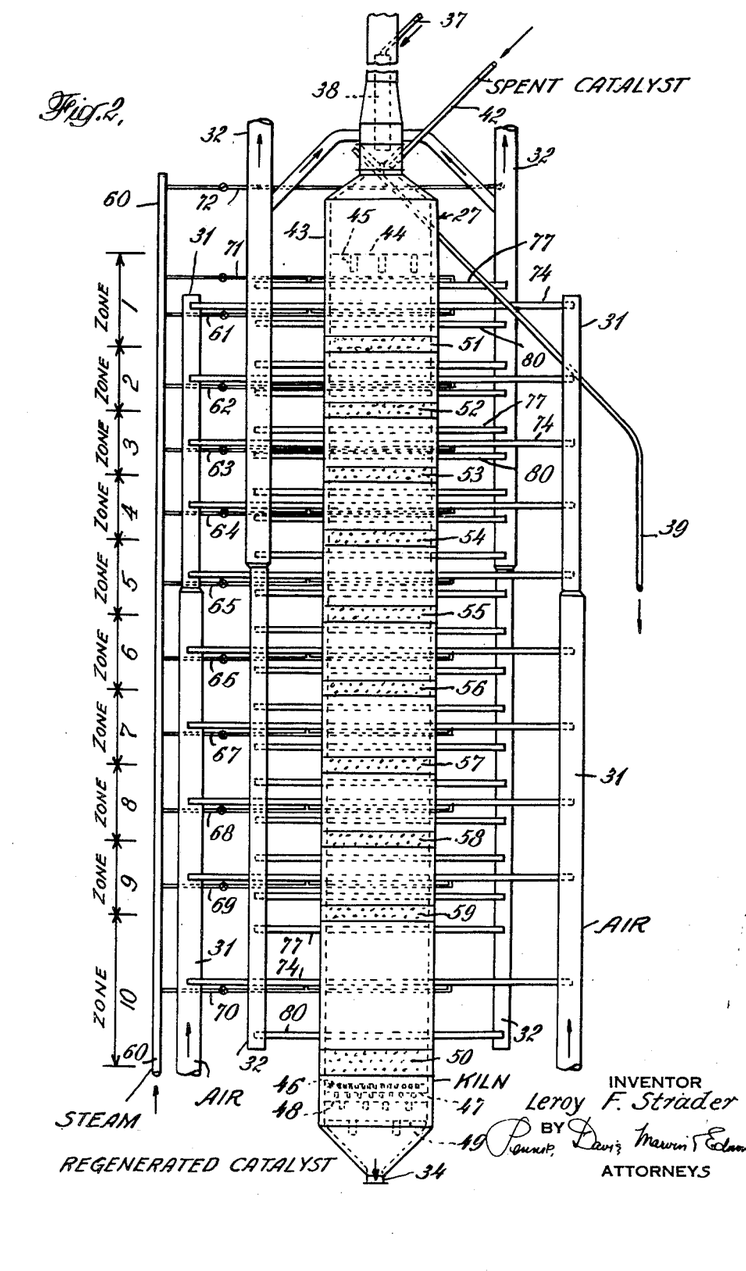
Figure 2 is an elevation of a kiln, such as that illustrated in Figure 1, equipped for the practice of my invention.
Figure 5:
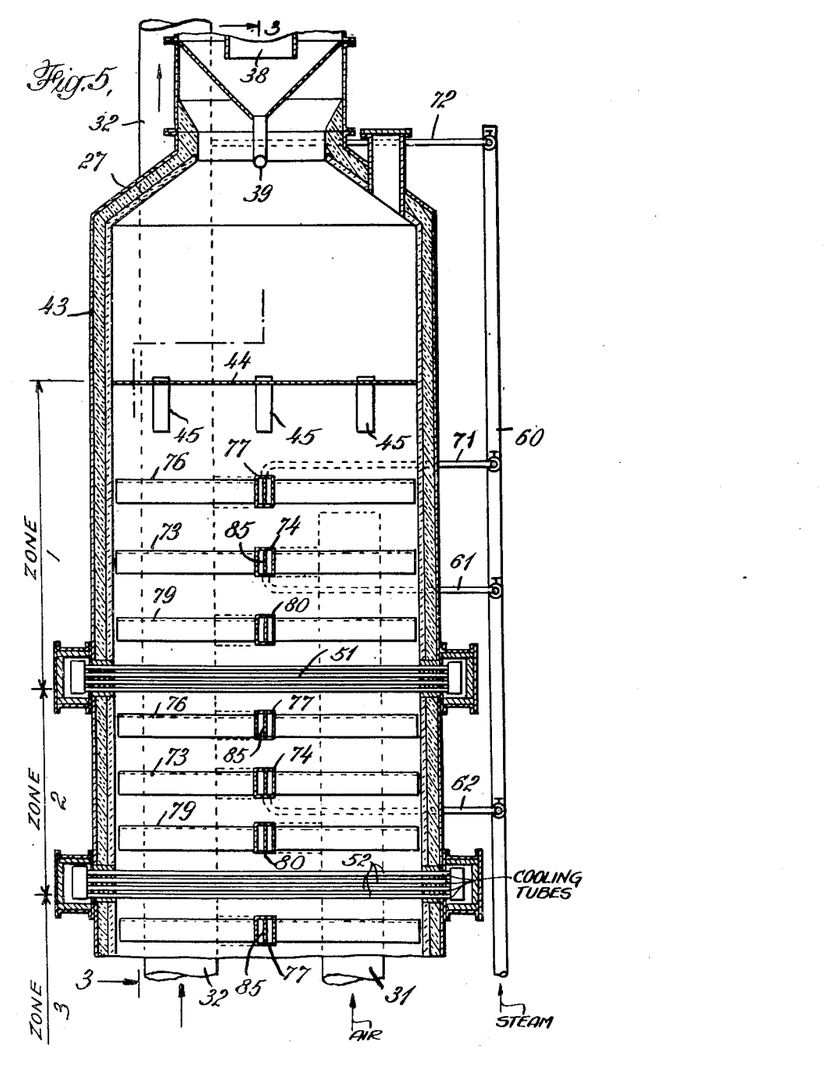
Figures 5 and 6 are, respectively, enlarged sections of the upper and lower parts of the kiln illustrated in Figure 2 taken at right angles to the sections constituting Figures 3 and 4, sections on line 5—5 of Figures 3 and 7 and on line 6—6 of Figure 4, respectively.
Figure 6:
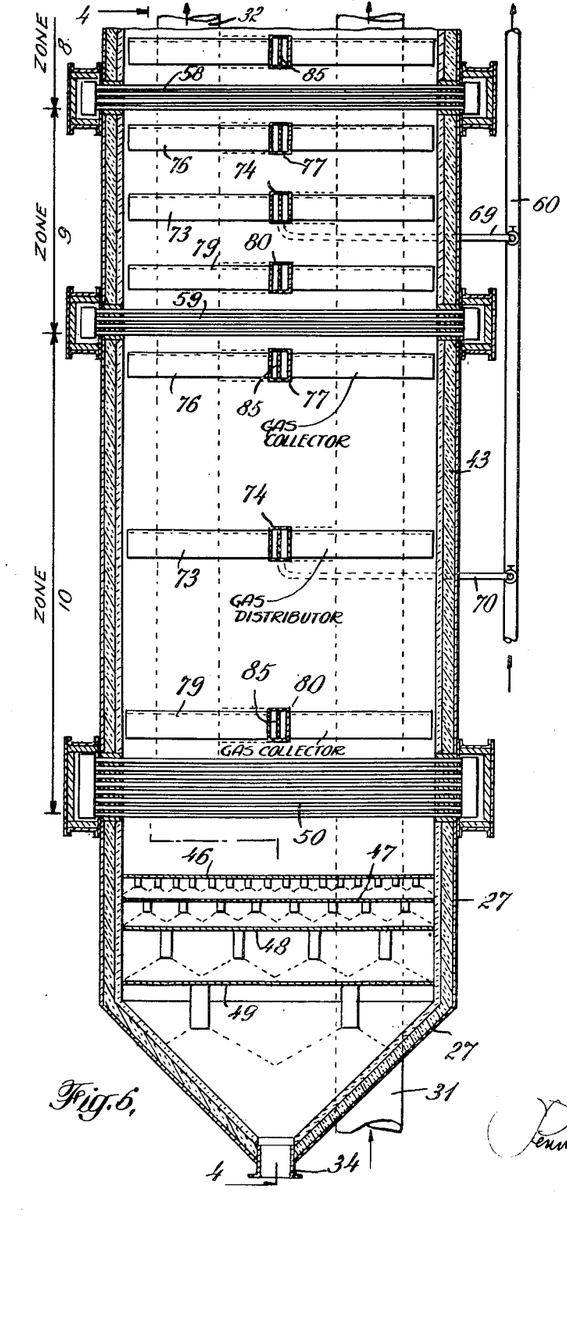
Figure 7:
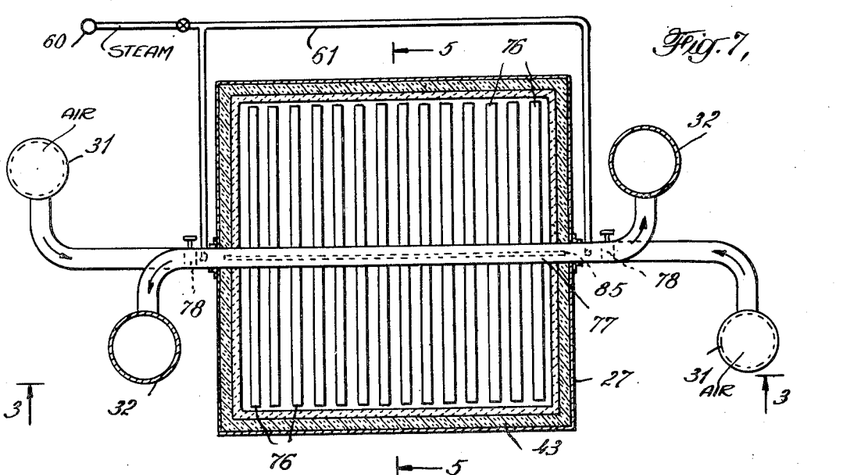
Figure 7 is a section on line 7—7 of Figure 3.
Figure 8:
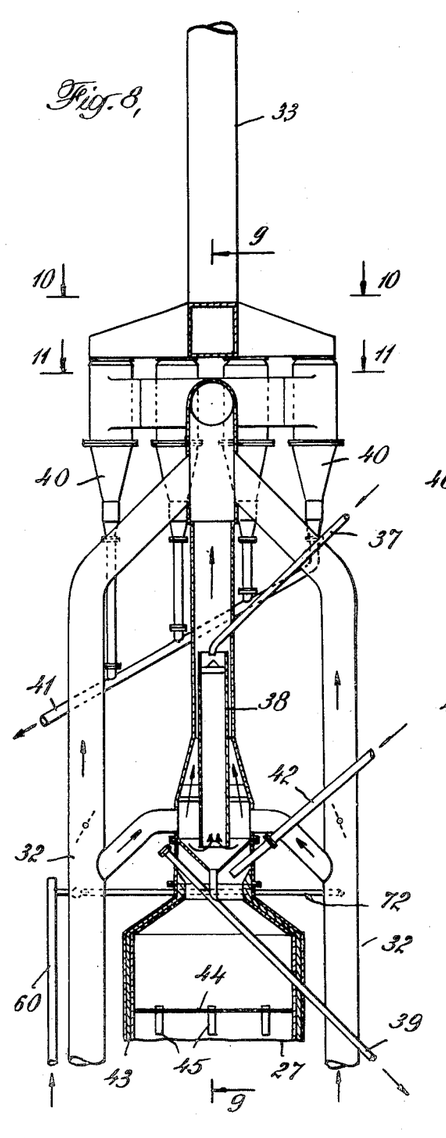
Figure 8 is an enlarged detail, partially in section and with parts broken away of the upper part of the kiln structure illustrated in Figure 1.
Figure 9:
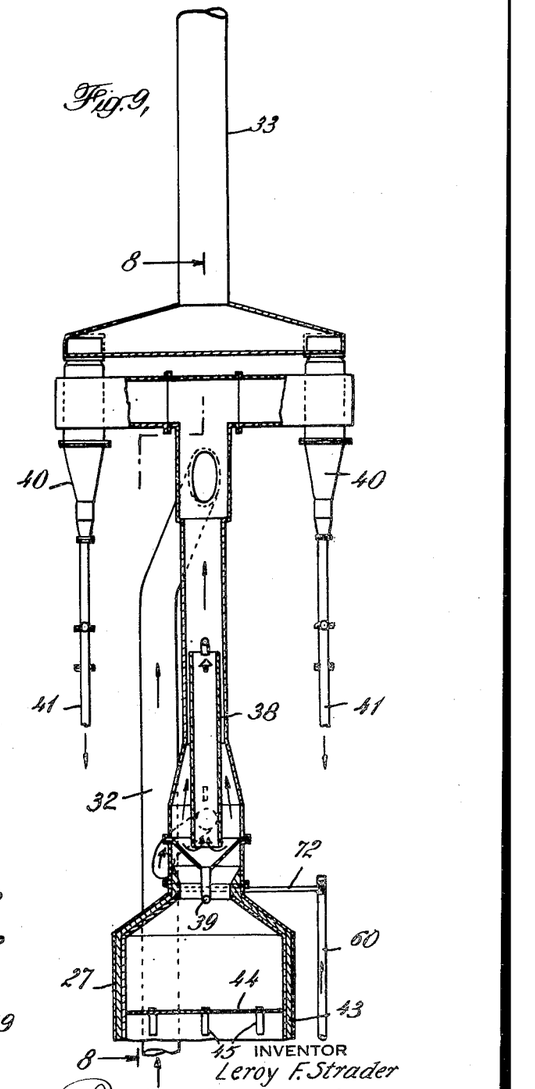
Figure 9 is a section on line 9—9 of Figure 8.
Figure 10:
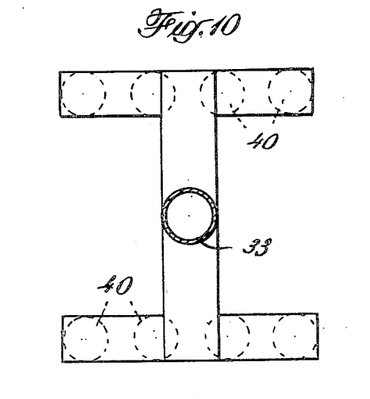
Figure 10 is a section on line 10—10 of Figure 8.
Figure 11:
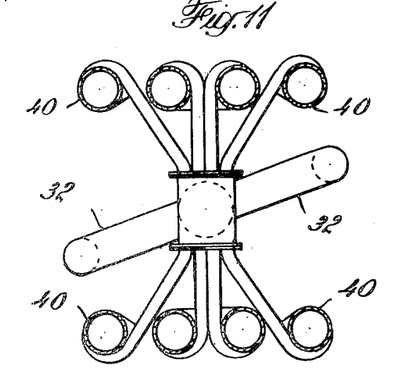
Figure 11 is a section on line 11—11 of Figure 8.
Figure 12:
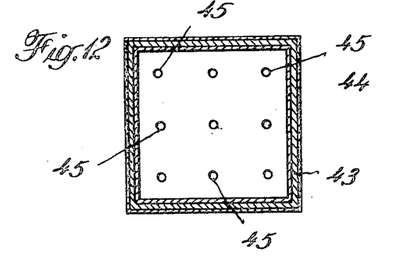
Figure 12 is a section on line 12—12 of Figure 3.
Figure 13:
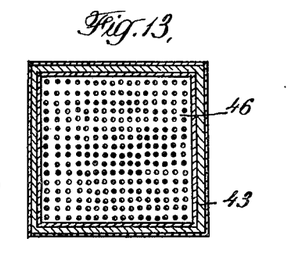
Figure 13 is a section on line 13—13 of Figure 4.
Figure 14:
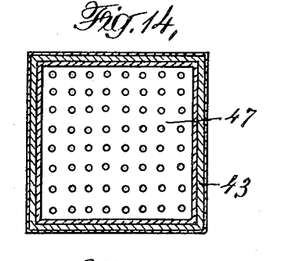
Figure 14 is a section on line 14—14 of Figure 4.
Figure 15:
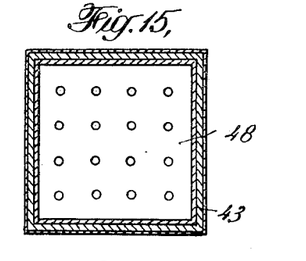
Figure 15 is a section on line 15—15 of Figure 4.
Figure 16:
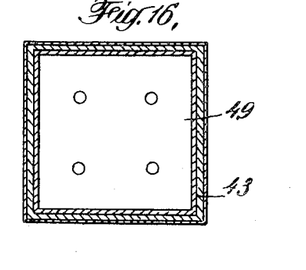
Figure 16 is a section on line 16—16 of Figure 4.
Figure 17:
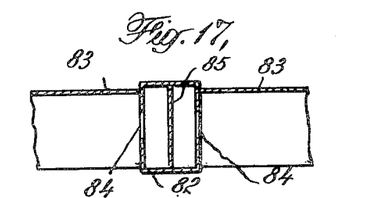
Figure 17 is a fragmentary section of any of the beam ducts associated with distributing or collecting troughs in the several sections illustrated in Figures 3, 4, 5 and 6, appearing in less detail particularly in Figures 5 and 6.

Referring to Figure 2 as an illustration of a kiln appropriate for carrying out the regeneration operations of the type to which my invention relates: The kiln comprises a rectangular thermally insulated and refractory lined shell 43. To promote uniform distribution of the catalyst over a horizontal section of the kiln, a distributor plate 44 carrying nine distributing tubes 45 is arranged at the upper end of the kiln, and to promote uniform flow of the catalyst downwardly through the kiln a series of collector plates 46, 47, 48 and 49 each carrying appropriately arranged distributing tubes is provided in the lower part of the kiln. The collector plates 44, 46, 47, 48 and 49 are detailed in Figures 12, 13, 14, 15 and 16, respectively. In operation, spent catalyst is charged into the upper end of the kiln through connection 42 and regenerated catalyst is discharged from the lower end of the kiln through connection 34, the kiln being maintained substantially full of catalyst between the lower ends of the distributing tubes 45 and the collector plate 46. This charge of catalyst is divided into ten bodies by nine groups of tubes 51, 52, 53, 54, 55, 56, 57, 58 and 59 through which a cooling medium is circulated, each of these bodies being within a zone independent of the others for control purposes. Another and a somewhat larger group of cooling tubes 50 is arranged beneath the tenth zone. For convenience of reference these several zones are numbered in Figure 2 (and in Figures 5 and 6), the zone through which the catalyst first passes being numbered 1 and the zone through which the catalyst last passes being numbered 10. A grid of distributing troughs for introduction of air is arranged centrally of each zone and is connected to the air manifolds 31. A pair of grids of collecting troughs is arranged above and below these distributing troughs in each zone and is appropriately connected to stack manifolds 32. The detail of these several zones will be further described in connection with Figures 3–7 and Figure 17. Valved connections 61, 62, 63, 64, 65, 66, 67, 68, 69 and 70 are provided for introducing steam, from manifold 60, into the grid of distributing troughs in each of the ten zones as may be required in carrying out my invention. Valved connections 71 and 72 are also provided for introduction of steam, from manifold 60, into the uppermost grid of collecting troughs in zone 1 into the stack manifolds 32 as a cooling agent, or, in an emergency as a smothering agent. The several connections between the manifold 60 and the several zones may also be used in an emergency to introduce steam as a smothering agent.

Referring to Figures 3–7 as more detailed illustrations of a kiln such as that diagramed in Figure 2: Each of the ten zones in the kiln 27 comprises a grid of distributing troughs 73 each opening into a beam duct 74 connected through dampers 75 to the air manifolds 31, a grid of collecting troughs 76 opening into a beam duct 77 connected through dampers 78 with the stack manifolds 32 and positioned above the distributing troughs, a grid of collecting troughs 79 opening into a beam duct 80 connected through dampers 81 to the stack manifolds 32 and positioned below the grid of distributing troughs, and a group of cooling tubes positioned below the lower grid of collecting troughs. In each zone, in operation, air from the manifolds 31 enters the body of catalyst in that zone through the grid of distributing troughs 73, flows in part upwardly through the body to the collecting troughs 76 and in part downwardly through the body to the collecting troughs 79 from which the products of combustion escape to the stack manifolds 32. The several beam ducts constituting the parts numbered 74, 77 and 80 in Figures 2–6 are illustrated in section in Figure 17 where the beam duct proper is numbered 82, the inner ends of an opposite pair of troughs are numbered 83, the openings through which the troughs communicate with the interior of the beam duct are numbered 84 and a reinforcing web extending through the beam duct across the interior of the kiln is numbered 85. The products of initial combustion, after leaving the catalyst in each zone, pass through the grids of troughs 76 and 79 into the beam ducts 77 and 80 through which they flow to the stack manifolds 32. While passing through the collecting troughs 76 and 79 and the beam ducts 77 and 80 within the kiln these gases remain in indirect heat exchange relationship with the catalyst in the zone. In the last zone, the tenth, the grids of collecting troughs are spaced farther from the grid of distributing troughs than in the other zones and the body of catalyst in the tenth zone is larger than in the other zones but in other respects the arrangement of the several zones is the same. The catalyst passing from each of the first nine zones to the next lower zone and from the tenth zone to the discharge connection 34 passes through a grid of cooling tubes to permit temperature control.

Figures 18, 19:
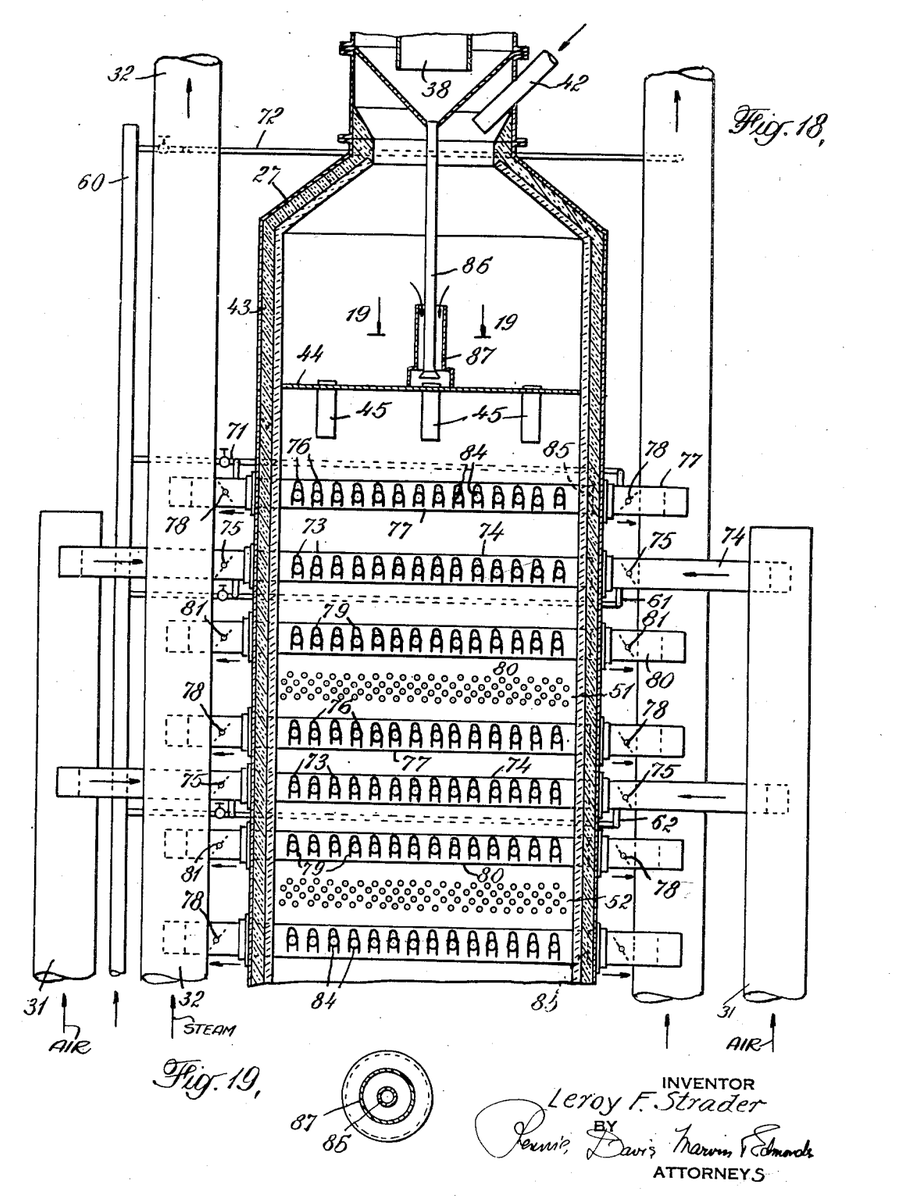
Figure 18 is a section, generally similar to Figure 3, showing a modified elutriator return.
Figure 19 is a section on line 19—19 of Figure 18.

Referring to Figure 18, instead of returning the coarser material separated in the elutriator to the foot of the elevator lifting the regenerated catalyst as in Figure 2, this coarser material is returned in this modification to the upper end of the kiln through connection 86 discharging into a boot 87 immediately above the central one of the distributing tubes 45 in the distributor plate 44. Corresponding parts in Figures 3 and 18 bear the same reference numerals.

Now, in describing my invention and its practice in the apparatus illustrated in the accompanying drawings, I will refer more particularly to Figure 2, but in doing so I do not mean to exclude the other figures of the drawings as illustrating the situation of the kiln in the complete process or details of the kiln structure.

Prior to my invention, the general practice in carrying out regeneration operations of this type was to blow air through the several bodies of catalyst at the aggregate rate required to burn off coke at the rate required to maintain the rate of supply of regenerated catalyst required by the cracking operation. In many operations the kiln capacity thus became the factor limiting the cracking capacity. Some variation of the distribution of the air between the several zones in the kiln was possible, but reduction of the rate of air supply to any zone meant a reduction in the coke burning capacity of that zone and consequently a reduction of the overall kiln capacity. When operating on this basis, particularly with synthetic aluminum silicate cracking catalysts, afterburning would occur in the third and fourth zones, sometimes in the second zone although not usually in the first zone and sometimes in the fifth and lower zones. When such afterburning occurred, temperatures as high as 1700° F. were encountered in the catalyst body in the zone involved. Catalyst economy, however, required the limitation of maximum temperatures to about 1150° F., certainly not more than 1200° F. Attempts to avoid the difficulty by reducing the air supplied to the zone or zones in which afterburning occurred accomplished nothing unless carried to a point such that the coke burning capacity of such zones were seriously reduced in which case the afterburning problem was merely shifted to a lower zone or zones in the kiln. Attempts to solve the problem were also made by introducing a cooling medium, steam or water, into the ducts within the kiln, in the zones involved, through which the products of combustion escape to the stack manifolds. In this manner the excessive temperatures resulting from afterburning could be reduced somewhat but the afterburning nevertheless occurred and the temperature reductions which could be effected within practical limits, in terms of the maximum rates at which steam or water could be introduced into the ducts through which the products of combustion passed to the stack manifolds, were too small to be significant, temperature reductions of the order of 100° F. being the sort of temperature reduction thus attainable. Contact between steam and the catalyst, particularly the more active synthetic catalysts, was avoided as far as possible on the theory, for which there was some basis in practical experience, that the activity of the catalyst was impaired by contact with steam.

After several months of effort based primarily upon refinement of these conventional approaches to the problem, particularly refinement of control, without success in terms of elimination of afterburning although sometimes with substantial reductions in kiln capacity, I tried the addition of water vapor to the air supplied to the zones in which afterburning occurred and discovered that, under certain conditions, I could thus eliminate afterburning. The conditions which I found to be effective to this end were, conjointly, the supplying of air to the several bodies of catalysts at a rate providing about 100%–300% excess with respect to the coke burned off and the addition of water vapor to the air supplied to the bodies in the zones in which afterburning occurred at rates aggregating about 0.01%–3% by weight on the catalyst. That is to say, the total or aggregate amount of steam added to the various zones per unit time divided by the total weight of catalyst passed through these zones in the same unit time (i. e., the rate of total steam flow in percent by weight of the catalyst passing through the combustion zones involved) is regulated, as by valves 63, 64, 65 and 66, so as to be within the stated limits. In terms of maintained catalyst activity, I found it advantageous to limit the aggregate to a maximum of about 1% by weight on the catalyst. The zones involved are those through which the catalyst passes at an early intermediate stage of its progress through the kiln. Usually such addition of water vapor is not required in the air supplied to the first zone if the number of zones exceeds five or six. The critical zones are usually those embracing the second fifth part of the catalyst travel through the kiln. For example, in a kiln with ten zones I have found that the addition of water vapor is not usually required in the first and second zones or in the seventh or lower zones. Usually the total addition of water vapor can be made to the air supplied to the third and fourth zones although sometimes it is advantageous to add a minor part of the water vapor to the air supplied to the fifth and sixth zones.

The following example of the practice of my invention will illustrate its application to an operation carried out in the particular equipment, and particularly the kiln illustrated in the accompanying drawings: The kiln was 12 ft. 6 in. square inside and the vertical height of the ten zones aggregated 100 ft. 6 inches. Spent catalyst was charged to the kiln at the rate of 150 tons per hour. The coke burned off of the spent catalyst in the kiln approximated 3500 to 4000 lbs. per hour. Air was supplied at a rate aggregating 1,500,000–1,800,000 cubic feet (measured at standard conditions and with a relative humidity of about 50%) per hour. The rate of air supply to the first zone was restricted to about one-half and that to the second zone to about two-thirds of the rate at which the air was supplied to each of the other zones. Water vapor was added as steam to the air supplied to the third and fourth zones at a total rate of about 900 lbs. per hour, at approximately equal rates to each of these two zones, or water vapor was added as steam to the air supplied to the third, fourth, fifth and sixth zones at a total rate of about 900 lbs. per hour, about 40% of the water vapor being supplied to each of the third and fourth zones and about 10% being supplied to each of the fifth and sixth zones. The catalyst being a highly active synthetic aluminum silicate cracking catalyst, the maximum temperatures attained in the first five zones were consistently below 1100° F. and the maximum temperatures attained in the second five zones were consistently below 1150° F. During one test period the $CO:CO_2$ ratio of the gas mixtures escaping from the third, fourth, fifth and sixth zones varied from about .50 to about .85, the ratio being a maximum for the effluent from the third zone and a minimum for the effluent from the fourth zone. For comparison I note that in this operation before water vapor was added to the air supplied to the third and fourth or to the third, fourth, fifth and sixth zones as just described, other conditions within the control of the operator being the same, temperatures in the third, fourth, fifth and sixth zones ranged as high as 1690° F.

In actual practice my invention has exhibited several important advantages some of them flowing directly from the avoidance of excessive temperatures resulting from the elimination of overburning. Others may be explained on the same basis but of this I am not certain. For example, I have found that high activities are maintained, notwithstanding the introduction of steam in contact with the catalyst, and particularly with highly active synthetic aluminum silicate catalysts. In some cases, increases in the average activity of the catalyst circulating in the complete process appear to be indicated. This result may of course be a composite of a gain in activity resulting from avoidance of overburning and a loss in activity resulting from steam contact. Avoidance of excessive temperatures within the kiln structure also accomplishes marked savings with respect to maintenance. If afterburning occurs with any frequency, elements of the kiln structure tend to warp and erode and hence to require replacements at relatively short intervals. Such replacements are themselves tedious and expensive but they also require protracted shut-downs of the equipment and thus the substantial losses incident to idle time for the system as a whole. The aggregate of such losses is of a magnitude such that some loss in catalyst activity could well be tolerated as an incident to the elimination of such losses. Physical degradation of the catalyst, and consequent formation of fines, is also reduced, in some instances, by the practice of my invention. This effect may well be another direct result of the elimination of overburning. In one aspect this effect avoids a cumulative disadvantage since the presence of fines appears to promote afterburning. Fines must be eliminated from the system in order to prevent packing, and consequent loss of freedom of movement and restriction of gas or vapor passage required in the cracking reactor as well as in the regenerating kiln as well as to minimize the tendency toward afterburning in the regenerating kiln. The cracking catalyst, particularly synthetic cracking catalysts, being expensive, catalyst losses represent an important item of cost.

While I do not predicate my invention upon this or any other hypothesis, I suggest that the surprising results I have accomplished by the addition of a small proportion of water vapor to part of the air supplied for burning off coke from the catalyst is due to a modification of specific activities of the catalyst by this limited contact with steam. This explanation would be consistent with the prevailing view that steam contact reduces the cracking activity of such catalysts in the sense that such a reduction, if it occurs, is a change in a specific activity. The proportion of steam I use is small and the fact that the practice of my invention does not involve any serious impairment of catlyst activity may be no more than a limitation of the effect of steam contact with respect to a specific activity, namely, cracking activity resulting from this quantitative limitation. However, activity to induce secondary combustion of the carbon monoxide content of the gaseous mixture produced by initial combustion of the coke burden of the catalyst may be another specific activity of the catalyst, and with respect to this activity the quantitative factor of steam contact may have a wholly different significance. This explanation also seems to be consistent with the fact that afterburning does not usually occur until some coke has been burned off of the catalyst. Perhaps some of the deposited coke must be removed before the catalyst develops or can exhibit this specific activity. If this explanation were correct, it would also follow that once modified in this respect the catalyst would no longer induce secondary combustion of carbon monoxide until this specific activity had somehow been restored. In any event, I have found that the air requirement appears to be related to the quantity of coke to be burned off whereas the water vapor requirement appears to be related to the quantity of catalyst to be regenerated. I also have observed that afterburning is more of a problem with highly active synthetic catalysts than with natural catalysts, fuller's earth and similar clays, and this may be due to a difference in specific activity of such catalysts with respect to secondary combustion of carbon monoxide.

While my invention is generally useful in the regeneration of cracking catalysts in the type of regeneration operation I have described, I find it to be particularly advantageous as applied to highly active aluminum silicate cracking catalysts.

I claim:

1. In the prevention of afterburning in the flue gases from the regeneration of coked granular cracking catalyst, said catalyst comprising a plurality of inorganic refractory oxides, during which regeneration coked catalyst moves downwardly through a plurality of vertically superimposed combustion zones, to each of which zones separate and independently controlled streams of air are admitted, from each of which zones separate streams of resulting flue gases are removed and in each of which zones a predetermined fraction of the total coke is burned off at temperatures below about 1200° F.; the method which comprises supplying air to all of said combustion zones at a rate substantially in excess of that required to burn the predetermined fraction of coke on the catalyst in any zone, and adding steam only to the air supplied to the early intermediate zones at rates such that the aggregate amount of steam so added is between about 0.1 to 3 percent by weight of the catalyst passing through said combustion zones.

2. In the prevention of afterburning in the flue gases from the regeneration of coked granular cracking catalyst, said catalyst comprising a plurality of inorganic refractory oxides, during which regeneration coked catalyst moves downwardly through a plurality of vertically superimposed combustion zones, to each of which zones separate and independently controlled streams of air are admitted, from each of which zones separate streams of resulting flue gases are removed and in each of which zones a predetermined fraction of the total coke is burned off at temperatures below about 1200° F.; the method which comprises supplying air to all of said combustion zones at a rate from about 100 to 300 percent in excess of that required to burn the predetermined fraction of coke on the catalyst in any zone, and adding steam only to the air supplied to zones comprising the second and third fifth of the total number of combustion zones, said steam being added to the various zones at rates such that the aggregate amount of steam so added is between about 0.1 to 3 percent by weight of the catalyst passing through said combustion zones.

3. The method of claim 2 characterized in that the major portion of the total steam added is injected in the air supplied to the second fifth of the total number of combustion zones.

4. The method of claim 2 characterized in that the aggregate amount of steam added is between about 0.1 and 1 weight percent of the catalyst.

5. The method of claim 2 in which the catalyst is a synthetic aluminum silicate.

LEROY F. STRADER.

REFERENCES CITED

The following references are of record in the file of this patent:

UNITED STATES PATENTS

| Number | Name | Date |
| --- | --- | --- |
| 1,832,217 | Joseph | Nov. 17, 1931 |
| 1,904,218 | Franceway | Jan. 18, 1933 |
| 2,303,717 | Arveson | Dec. 1, 1942 |
| 2,317,379 | Hemminger | Apr. 27, 1943 |
| 2,331,433 | Simpson et al. | Oct. 12, 1943 |
| 2,367,281 | Johnson | Jan. 16, 1945 |
| 2,384,356 | Tyson | Sept. 4, 1945 |
| 2,393,839 | Thomas et al. | Jan. 29, 1946 |
| 2,398,186 | Loy | Apr. 9, 1946 |
| 2,409,596 | Simpson et al. | Oct. 15, 1946 |
| 2,414,002 | Thomas et al. | Jan. 7, 1947 |
| 2,436,041 | Gerhold et al. | Feb. 17, 1948 |